(12) United States Patent
Chen

(10) Patent No.: US 7,011,423 B2
(45) Date of Patent: Mar. 14, 2006

(54) MULTIFUNCTION WARNING DEVICE

(76) Inventor: Hsiu Chin Chen, No.6, Alley 12, Lane 9, Sec. 2, Changping Rd, Beitun District, Taichung City 406 (TW)

( * ) Notice: Subject to any disclaimer, the term of this patent is extended or adjusted under 35 U.S.C. 154(b) by 109 days.

(21) Appl. No.: 10/822,759

(22) Filed: Apr. 13, 2004

(65) Prior Publication Data

US 2005/0030737 A1  Feb. 10, 2005

Related U.S. Application Data

(63) Continuation-in-part of application No. 10/633,420, filed on Aug. 4, 2003, now Pat. No. 6,899,441.

(51) Int. Cl.
*A63B 15/02* (2006.01)
*F21L 4/08* (2006.01)
*F21L 13/06* (2006.01)

(52) U.S. Cl. ............... 362/102; 362/183; 362/184; 362/190; 362/192; 362/388; 340/321

(58) Field of Classification Search ........... 362/102, 362/183, 184, 190, 192, 193, 228, 238, 239, 362/250, 388, 486; 340/321; 320/114, 115, 320/166; 290/1 C, 1 E
See application file for complete search history.

(56) References Cited

U.S. PATENT DOCUMENTS

| | | | | |
|---|---|---|---|---|
| 5,081,568 A | * | 1/1992 | Dong et al. | 362/184 |
| 5,684,452 A | * | 11/1997 | Wang | 340/321 |
| 5,905,359 A | * | 5/1999 | Jimena | 320/114 |
| 6,683,532 B1 | * | 1/2004 | Peet et al. | 340/321 |
| 6,857,756 B1 | * | 2/2005 | Reiff et al. | 362/184 |
| 6,866,395 B1 | * | 3/2005 | Phipps et al. | 362/184 |
| 2002/0136005 A1 | * | 9/2002 | Lee | 362/190 |
| 2004/0062039 A1 | * | 4/2004 | Ahn | 362/192 |

* cited by examiner

*Primary Examiner*—Alan Cariaso
(74) *Attorney, Agent, or Firm*—Birch, Stewart, Kolasch & Birch, LLP

(57) ABSTRACT

A multifunction warning device is provided for being used as a flashlight, a warning sign or an illuminating traffic baton. The multifunction warning device mainly contains a base, plural legs, and a rechargeable device. The base has a top portion and a bottom portion having a first electric socket therein. Each of the plural legs is pivotally secured to the base. Each of the plural legs has plural illuminating elements thereon. The plural illuminating elements are electrically connected to the first electric socket. The rechargeable device contains a shell, plural rechargeable batteries, a charging circuit, and a discharging circuit. The shell has a charging connector detachably plugged into the first electric socket and thereby electric power is provided from the rechargeable batteries to the illuminating elements. The plural legs are stretchable to be a support and retractable to be assembled as a baton.

18 Claims, 10 Drawing Sheets

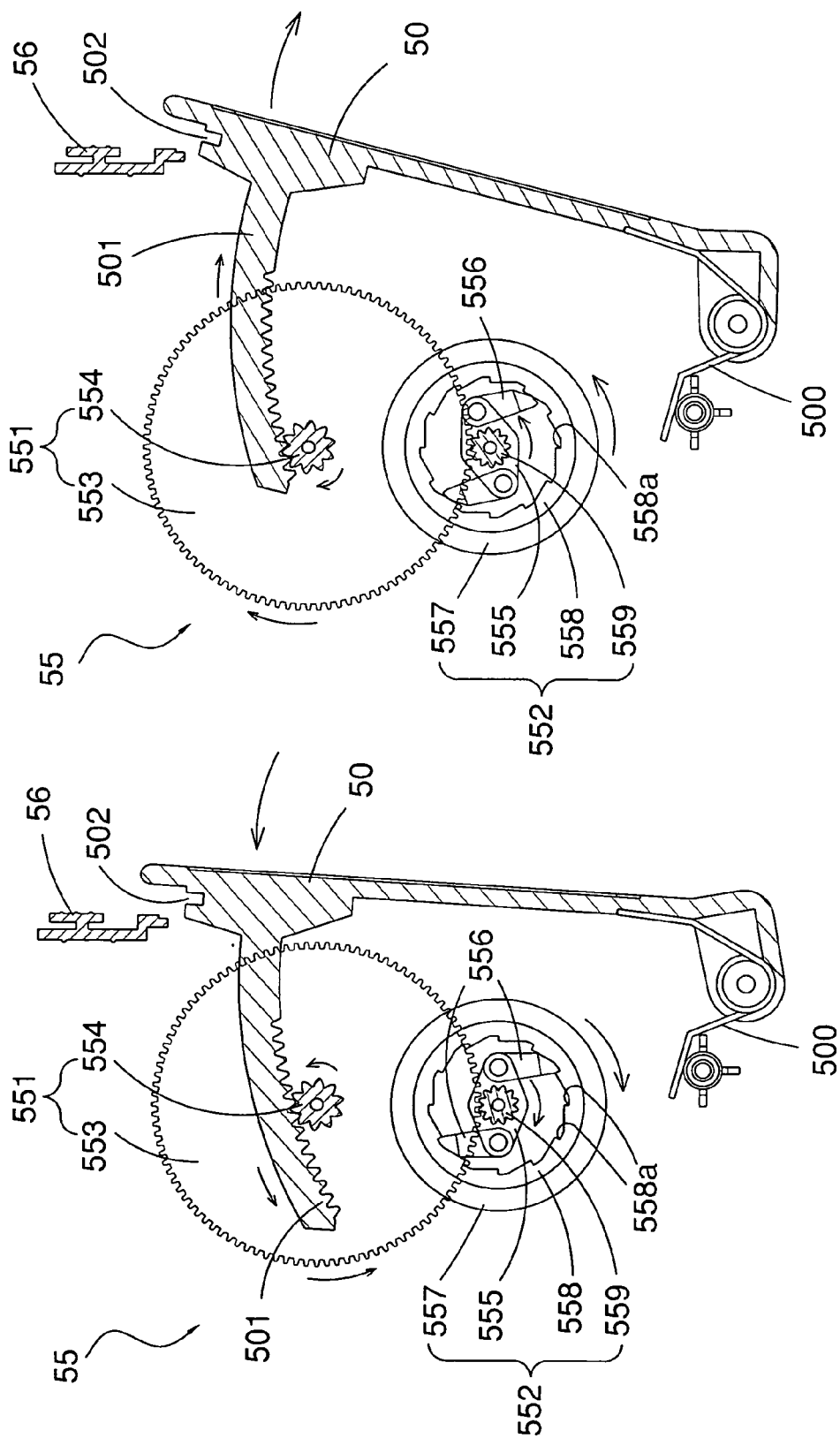

MULTIFUNCTION WARNING DEVICE

This application is a Continuation-In-Part of application Ser. No. 10/633,420, filed on Aug. 4, 2003, now U.S. Pat. No. 6,899,441 the entire contents of all are hereby incorporated by reference.

TECHNICAL FIELD

This invention relates generally to a warning device, in particular, a multifunction warning device having features of being a flashlight, a warning sign and an illuminating traffic baton.

BACKGROUND OF THE INVENTION

A conventional warning device is a triangle frame on which a reflective material is adhered such that when a car accident happened or a car is out of order, the driver puts the warning device on a position behind of the car at a certain distance for warning the following cars not to drive in this same line to prevent a possible accident. However, the conventional warning device has only one feature and the reflection function may be reduced in a fog area or a dark area and possibly be omitted because of its small occupation.

A conventional multi-purposes warning device includes a battery container, a tube threadedly engaged to an end of the battery container and a flash bulb disposed in the tube, a bracket pivotally engaged to the tube and a flashlight head pivotally engaged to the bracket, a socket slidably mounted to the battery container and the tube, and three legs, wherein each of the three legs has an end pivotally connected to the socket and a stick pivotally connected between the inner side of each of the legs and an outer periphery of the battery container, such that the three legs can be arranged to be a triangle warning sign and the flash bulb provides a flash light. However, the conventional multi-purposes warning device cannot be used as a traffic baton. In addition, the warning effect is not good enough because the legs as a warning sign cannot illuminate by themselves.

None of the conventional warning device has a battery that can be recharged through different ways. Therefore a multifunction warning device that can be used as a flashlight, a traffic warring sign and illuminating traffic baton and at the same time its battery can be recharged manually as well as through automobile charging system is needed.

SUMMARY OF INVENTION

It is therefore an objective of the present invention to provide a multifunction warning device that can be used as a flashlight, a traffic warring sign and illuminating traffic baton.

Another object of the invention is to provide a multifunction warning device with a battery that can be recharged manually or through automobile charging system.

The present invention, briefly summarized, in one embodiment discloses a multifunction warning device, which mainly contains a base, plural legs, and a rechargeable device. The base has a top portion and a bottom portion having a first electric socket therein. Each of the plural legs is pivotally secured to the base. Each of the plural legs has plural illuminating elements thereon. The plural illuminating elements are electrically connected to the first electric socket. The rechargeable device contains a shell, plural rechargeable batteries, a charging circuit, and a discharging circuit. The shell has a charging connector detachably plugged into the first electric socket. The charging connector has a first electric contact, a second electric contact and a third electric contact. The plural rechargeable batteries are installed within the shell. The charging circuit is installed within the shell. The charging circuit is electrically connected to the plural rechargeable batteries and a first electrical point (not shown) between the first electric contact and the second electric contact for recharging the plural rechargeable batteries through the first electric contact and the second electric contact when the charging connector is plugged into an automobile charging socket. The discharging circuit is installed within the shell, the discharging circuit is electrically connected to the plural rechargeable batteries and a second electrical point (not shown) between the first electric contact and the third electric contact for providing electric power from the plural rechargeable batteries to the plural illuminating elements through the first electric contact, the third electric contact and the first electric socket when the charging connector is plugged into the first electric socket. The plural legs are stretchable to be a support and retractable to be assembled as a baton.

BRIEF DESCRIPTION OF DRAWINGS

The invention will be more clearly understood after refer to the following detailed description read in conjunction with the drawings wherein

FIG. 10 is a perspective view demonstrating the movements of the driving set of the manual power generator when the handle is pressed; and FIG. 11 is a perspective view demonstrating the movements of the driving set of the manual power generator when the handle is released.

DETAILED DESCRIPTION OF PREFERRED EMBODIMENTS

Figure 1:
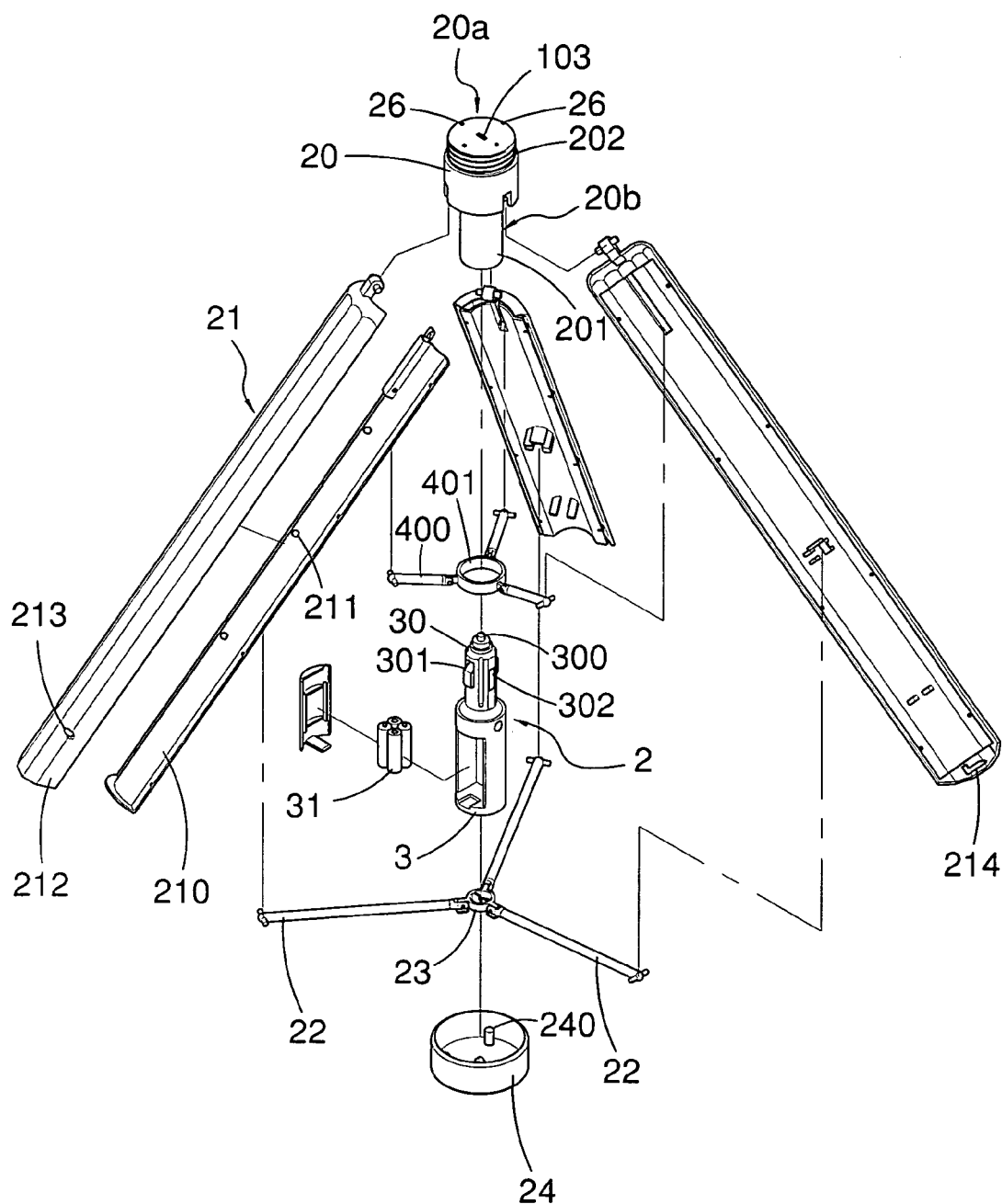
FIG. 1 is an exploded view of an embodiment.

With reference to FIG. 1, a first embodiment of the present invention mainly contains a base 20, three legs 21, and a rechargeable device 2. The base 20 has a top portion 20a and a bottom portion 20b having a first electric socket 201 therein. Each of the three legs 21 is pivotally secured to the base 20. Each of the three legs 21 has plural illuminating elements 211 thereon. The plural illuminating elements 211 are electrically connected to the first electric socket 201. The illuminating elements 211 are LEDs. The rechargeable device 2 contains a shell 3, plural rechargeable batteries 31, a charging circuit 32, and a discharging circuit 33. The shell 3 has a charging connector 30 detachably plugged into a power socket, which is an automobile charging socket 1 or the first electric socket 201. The charging connector 30 has a first electric contact 300, a second electric contact 301 and a third electric contact 302. The plural rechargeable batteries 31 are installed within the shell 3. The charging circuit 32 is installed within the shell 3. The charging circuit 32 is electrically connected to the plural rechargeable batteries 31 and a first electrical point between the first electric contact 300 and the second electric contact 301 for recharging the plural rechargeable batteries 31 through the first electric contact 300 and the second electric contact 301 when the charging connector 30 is plugged into the automobile charging socket 1. The discharging circuit 33 is installed within the shell 3, the discharging circuit 33 is electrically connected to the plural rechargeable batteries 31 and a second electrical point between the first electric contact 300 and the third electric contact 302 for providing electric power from the plural rechargeable batteries 31 to the plural illuminating elements 211 through the first electric contact 300, the third electric contact 302 and the first electric socket 201 when the charging connector 30 is plugged into the first electric socket 201. The three legs 21 are stretchable to be a support and retractable to be assembled as a baton.

Figure 3:
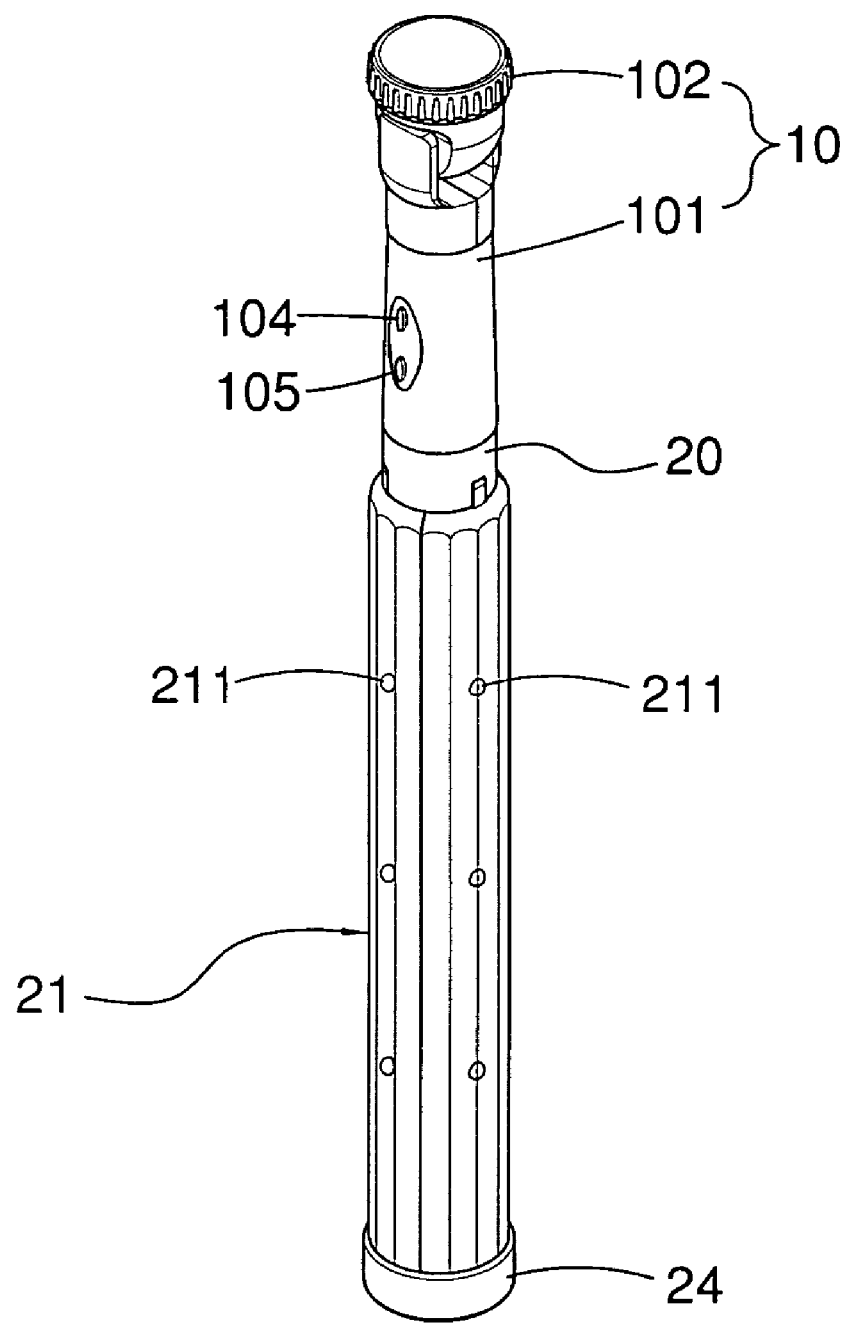
FIG. 3 is a perspective view of the embodiment when used as a flashlight.
Figure 4:
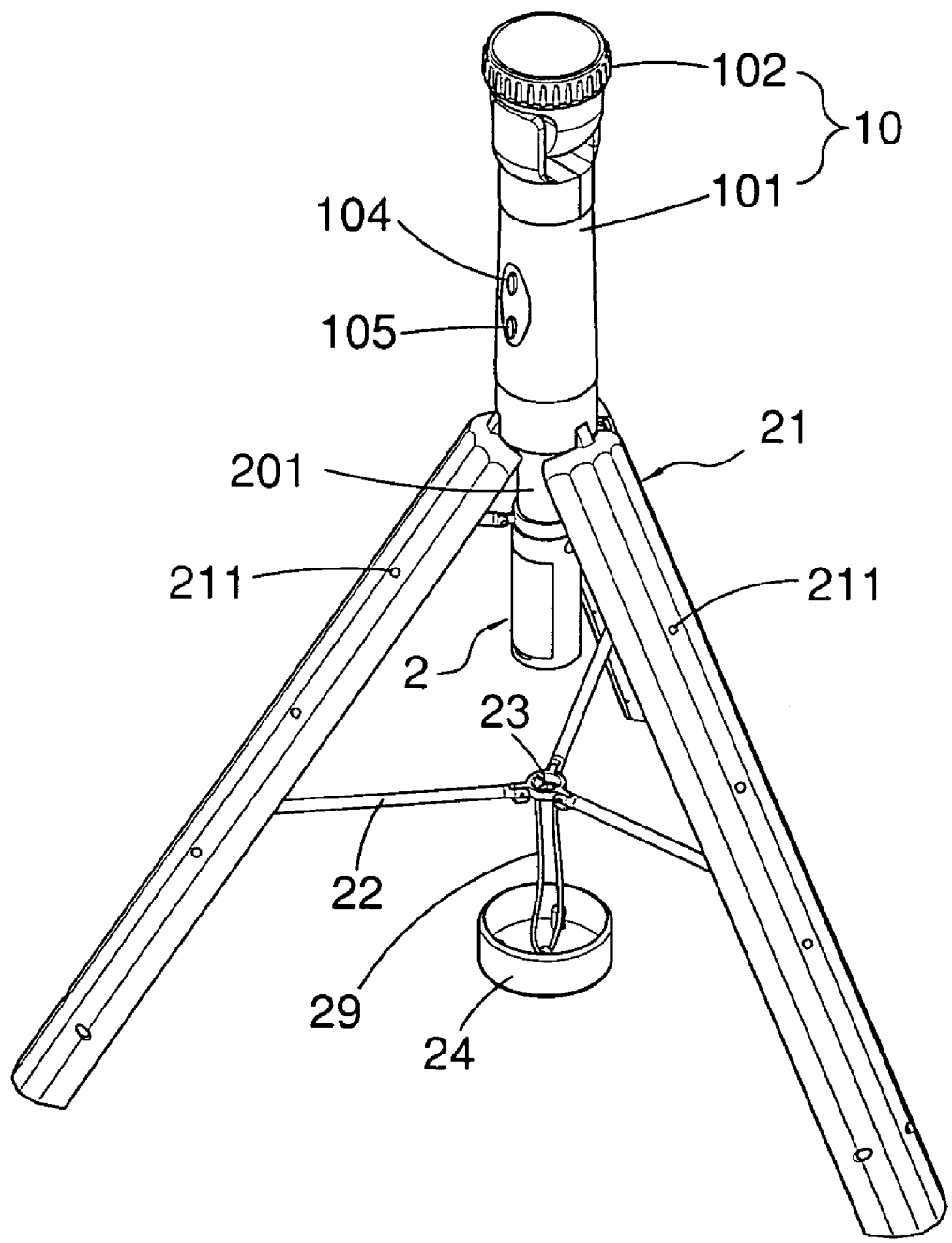
FIG. 4 is a perspective view of the embodiment when used as a warning sign with a tripod.
Figure 6:
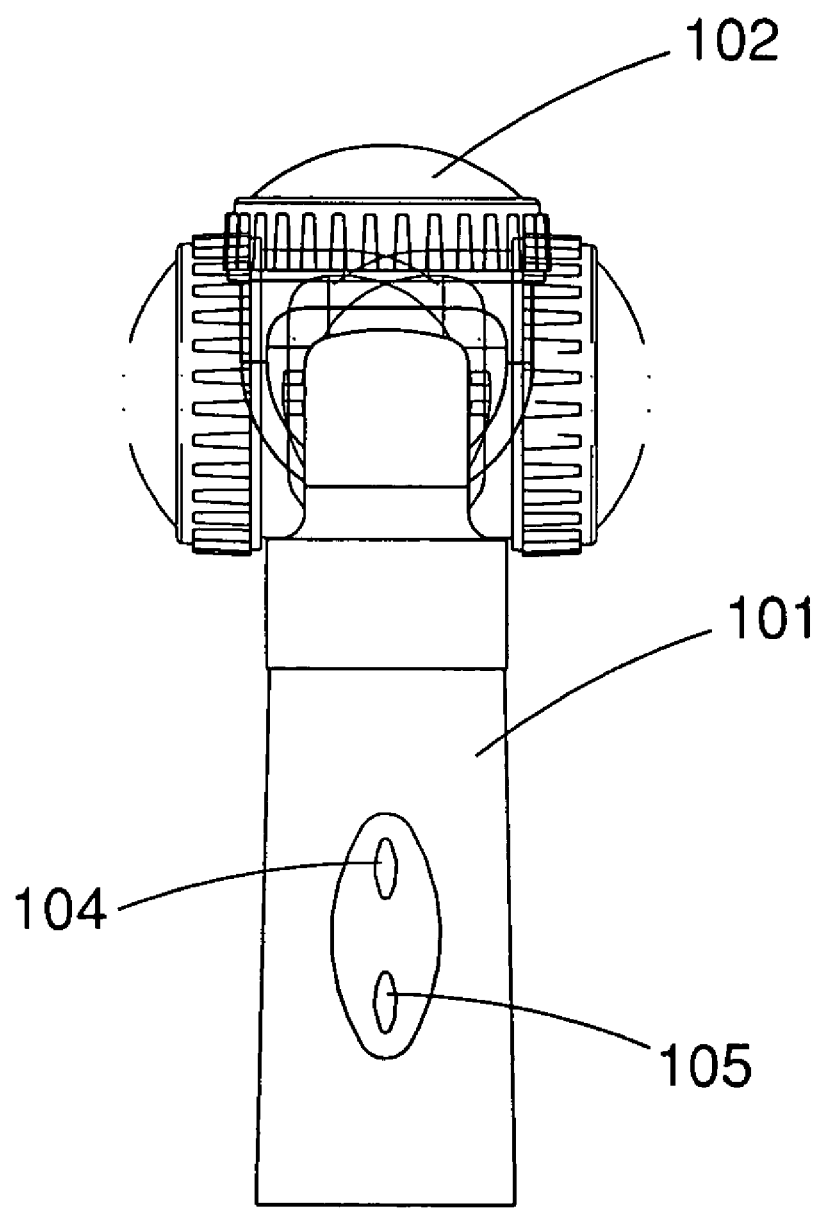
FIG. 6 is a perspective view showing the illuminating device with a pivotally connected lamp.

With reference to FIG. 3 and FIG. 4 and FIG. 6, an illuminating device 10 is coupled with the embodiment. The illuminating device 10 contains a body 101 pivotally connected to the top portion 20a of the base 20 and a lamp 102 mounted at the body 101. The lamp 102 is electrically connected to the rechargeable device 2. The body 101 is detachably mounted to the top portion 20a of the base 20. The body 101 has a second electric socket 12 pluggable by the charging connector 30, whereby the rechargeable device 2 can provide electric power directly to the lamp 102 of the illuminating device 10. Therefore, the illuminating device 10 together with the rechargeable device 2 is used as a flashlight.

Figure 2:
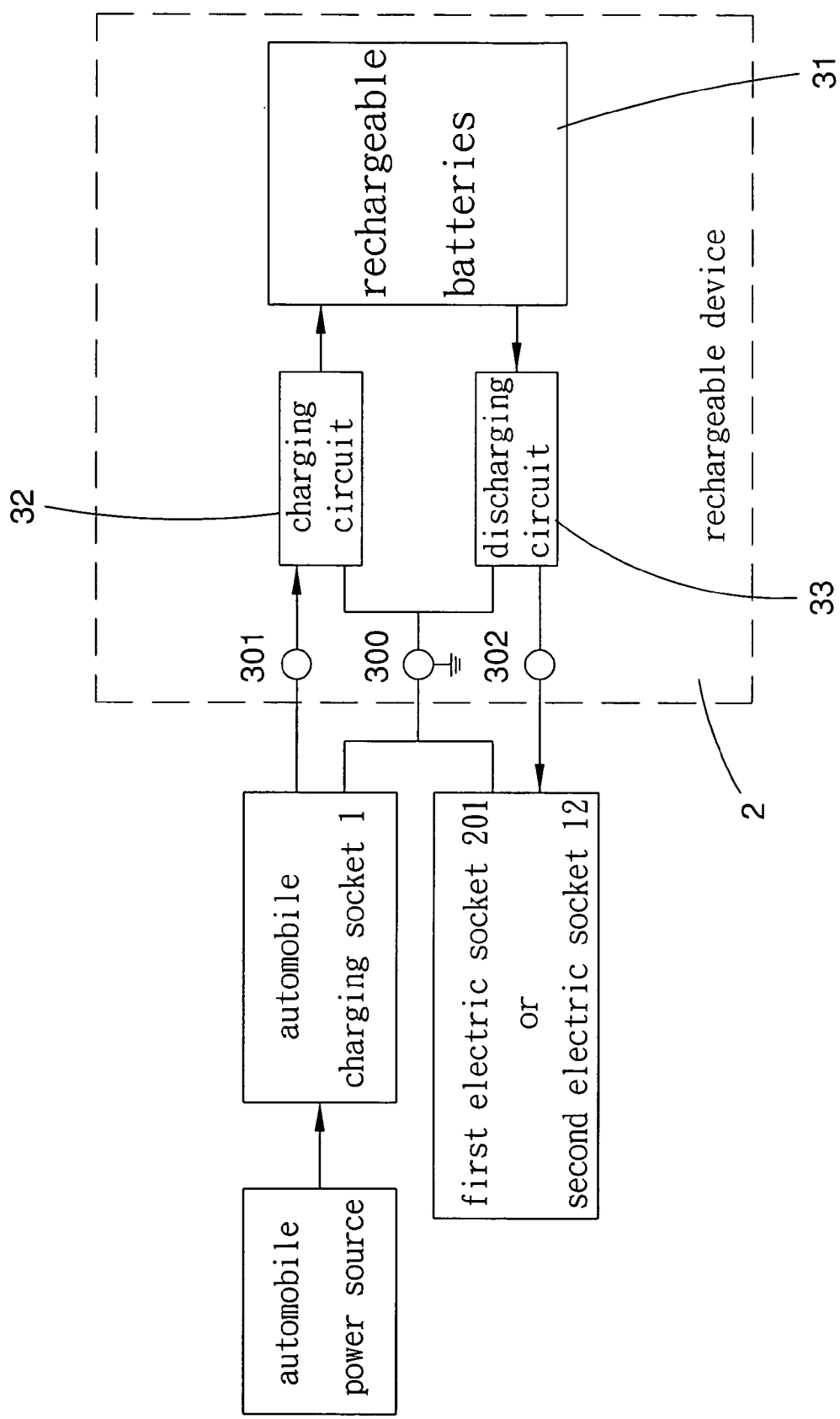
FIG. 2 is a block diagram demonstrating charging and discharging functions in accordance with the embodiment.

With reference to FIG. 2, the automobile charging socket 1 (or a household power source) provides electric power through the first electric contact 300 and the second electric contact 301 to charge the rechargeable batteries 31. The rechargeable batteries 31 provides electric power through the first electric contact 300 and the third electric contact 302 to the first electric socket 201 or the second electric socket 12.

Figure 5:
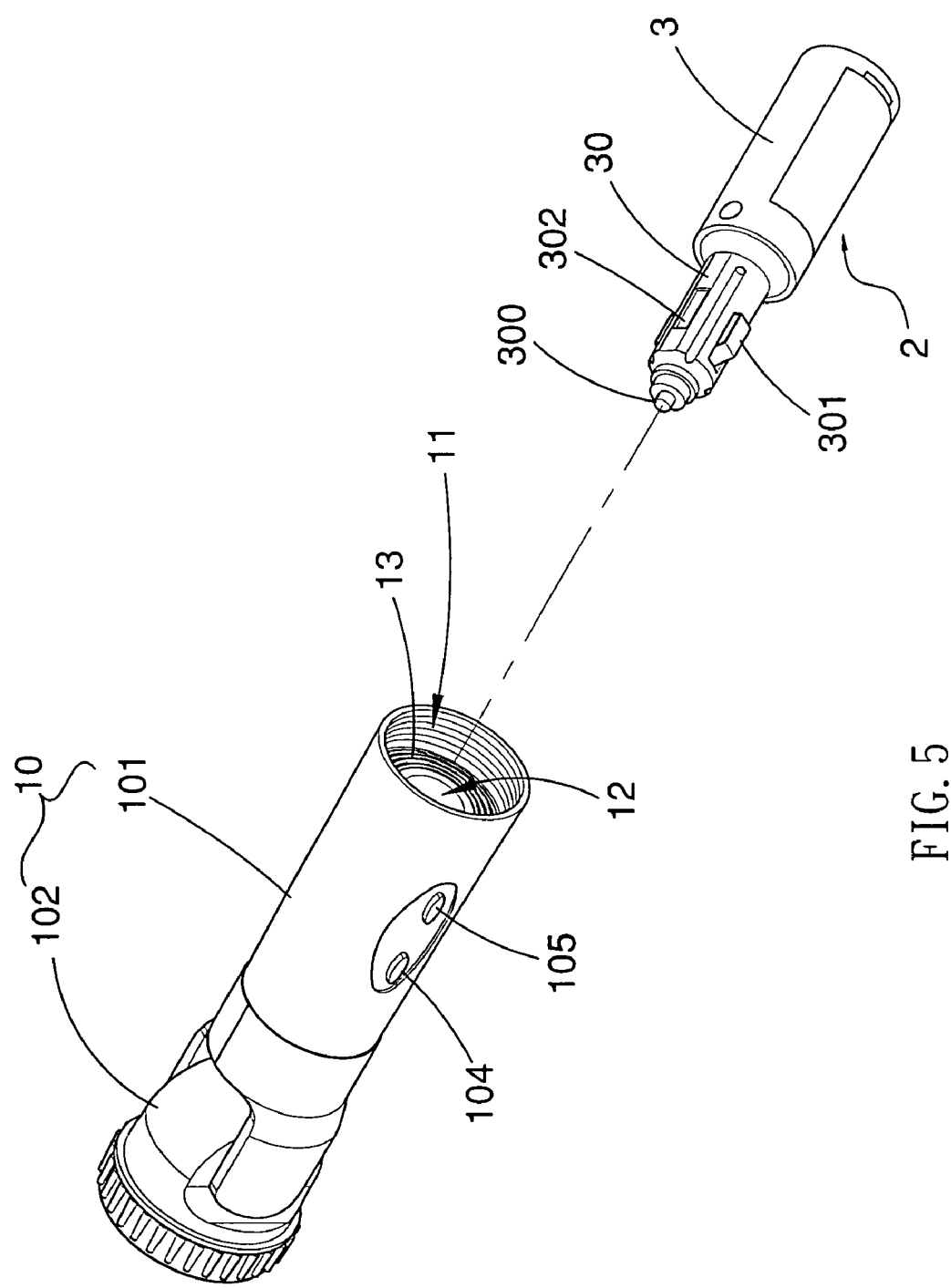
FIG. 5 is an exploded view showing the rechargeable device used directly with the illuminating device.

With reference to FIG. 1, the base 20 has a first switch 103 thereon for deciding whether the rechargeable device 2 is electrically connected to the plural illuminating elements 211. Referring to FIG. 3 and FIG. 4, the body 101 of the illuminating device 10 has a second switch 104 and a third switch 105 thereon. The second switch 104 is for deciding whether the rechargeable device 2 is electrically connected to the lamp 102 of the illuminating device 10 and the third switch 105 is for deciding whether the rechargeable device 2 is electrically connected to the plural illuminating elements 211. With reference to FIG. 1 and FIG. 5, the top portion 20a of the base 20 forms an outer threaded periphery 202 engagable with an inner threaded periphery 11 in the body 101 of the illuminating device 10. The top portion 20a of the base 20 also has plural outer elastic electric contacts 26 thereon and the body 101 of the illuminating device 10 further contains plural inner ring electric contacts 13 therein. The plural outer elastic electric contacts 26 are electrically connected to the plural inner ring electric contacts 13 when the body 101 is threadly mounted at the top portion 20a of the base 20.

Figure 7:
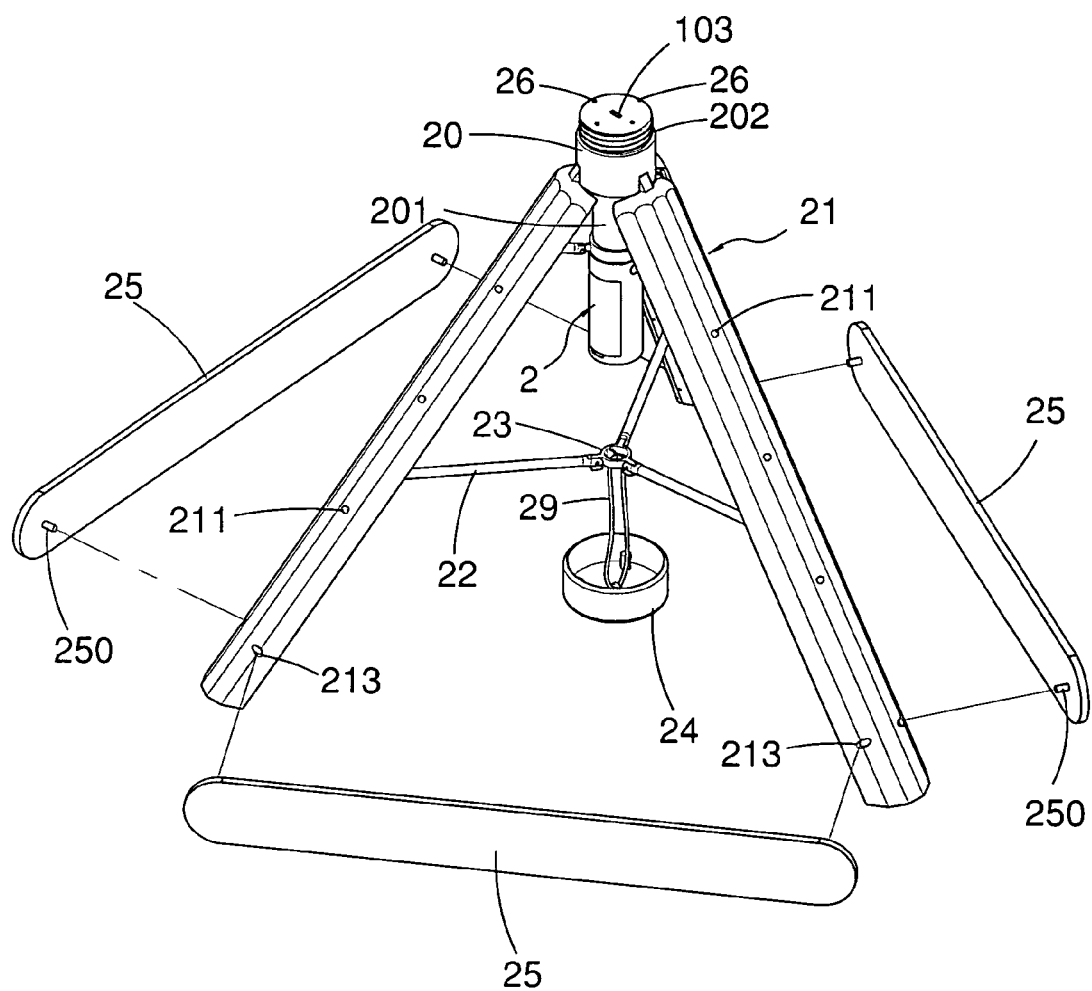
FIG. 7 is an exploded view of the embodiment showing the three bars engagable with the three legs to enhance the strength of the three legs.

The first embodiment has three first rods 22 and a first ring 23 for restrain the movements of the three legs 21 when the three legs 21 are stretched to be used as a tripod. Each of the three first rods 22 is pivotally connected to a middle portion of each of the three legs 21 with one end and pivotally connected to the first ring 23 with the other end. Each of the three legs 21 contains a longitude frame 210 and a light pervious shell 212. The longitude frame 210 has the plural LEDs 211 thereon. The longitude frame 210 is pivotally secured to the base 20. The light pervious shell 212 is fastened to the longitude frame 210. The light pervious shell 212 covers the plural LEDs 211. With reference to FIG. 7, the first embodiment has three bars 25. Each of the three bars 25 is engaged with two adjacent legs for enhancing strength of the three legs 21. Each of the three bars 25 has two protrusions 250 on its two ends respectively. Each of the three legs 21 contains two holes 213 therein; wherein one of the two protrusions 250 is engaged with a hole of a leg and the other protrusion is engaged with a hole of an adjacent leg. Referring to FIG. 1, the first embodiment has three second rods 400 and a second ring 401. Each of the three second rods 400 is pivotally connected to a front portion of each of the three legs 21 with one end and pivotally connected to the second ring 401 with the other end.

With reference to FIG. 1, the first embodiment has a bottom cover 24 having three engaging hooks 240 thereon. Each of the plural legs 21 has a positioning hook 214 at its end, wherein each of the three engaging hooks 240 is engaged with each of the positioning hook 214 when the bottom cover 24 is tightened to assemble the plural legs as a baton (FIG. 3). With reference to FIG. 4 and FIG. 7, a rope 29 connects the first ring 23 to the bottom cover 24 to avoid missing of the bottom cover 24.

Figure 8:
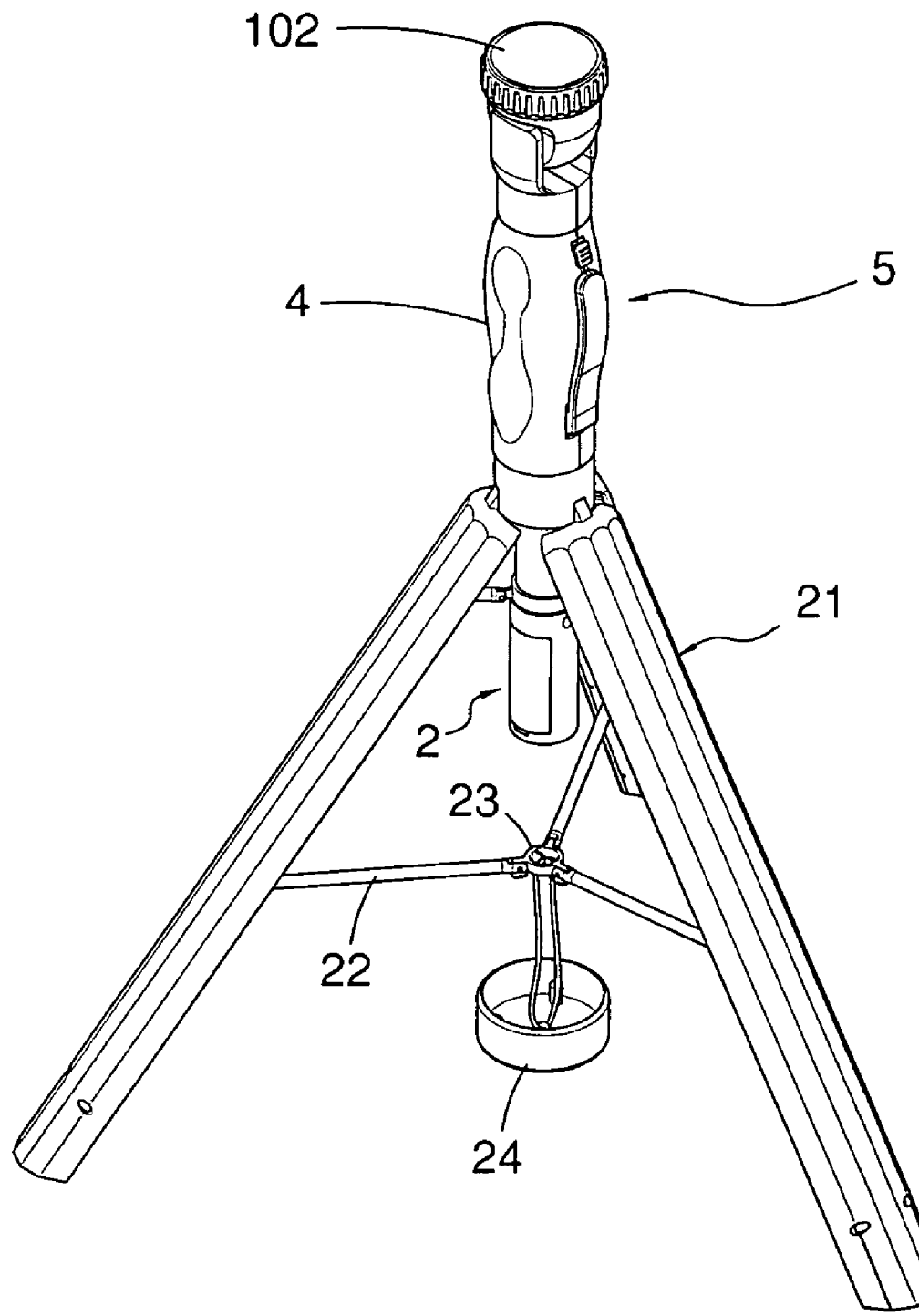
FIG. 8 is a perspective view of another embodiment showing a manual power generator is used in the embodiment.
Figure 9:
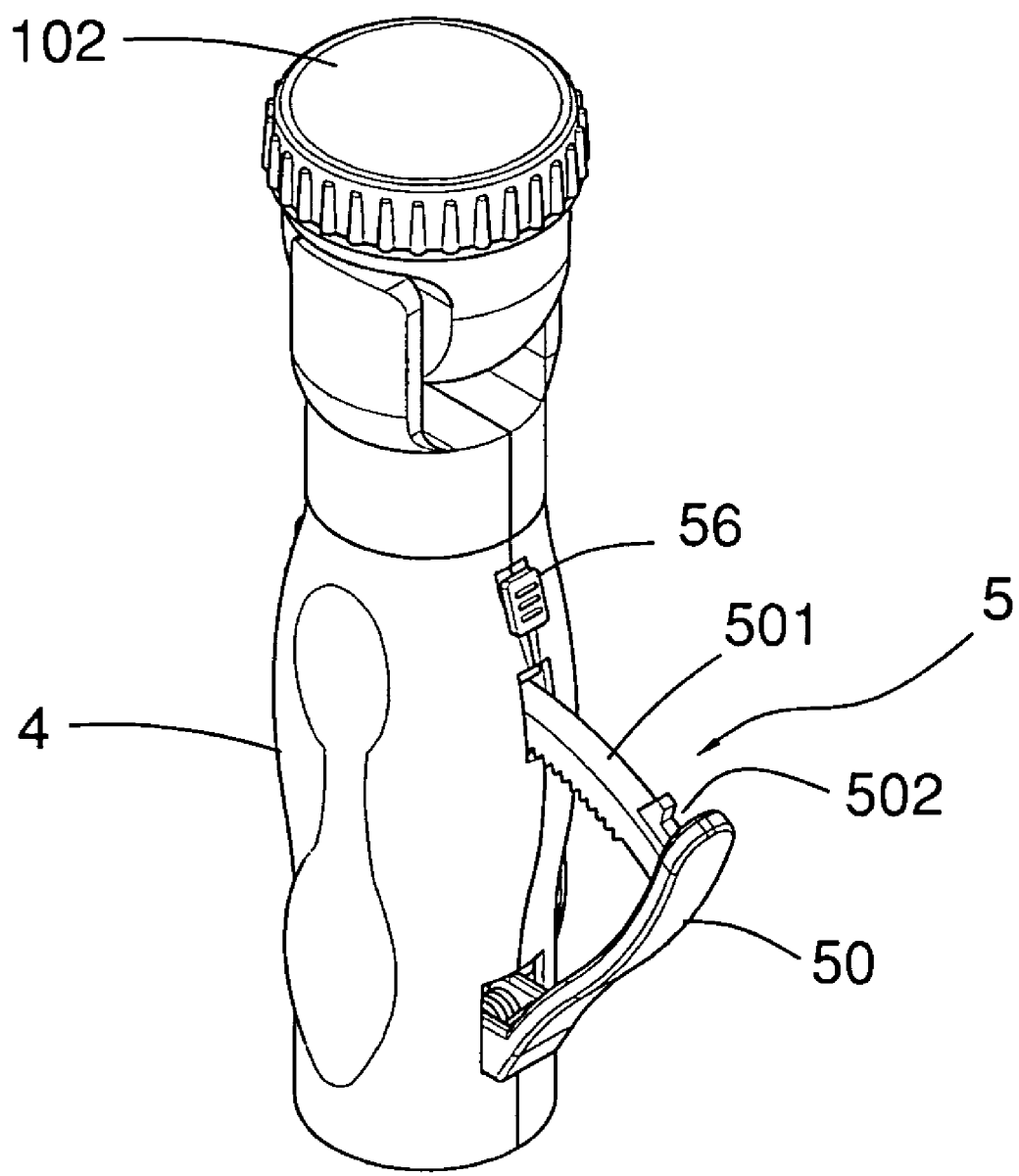
FIG. 9 is a perspective view of the embodiment showing a manual power generator is used alone with the illuminating device.

With reference to FIG. 8, the second embodiment has the same elements and structures of the first embodiment besides that the second embodiment further contains a manual power generator 5 installed in the body 101 of the illuminating device 10 for manually providing electric power to the lamp 102. Referring to FIG. 9, the manual power generator 5 together with the illuminating device 10 alone is used as a flashlight.

With reference to FIG. 10 and FIG. 11, the manual power generator 5 mainly contains: a housing 4, a power generating unit (not shown), a driving set 55, a handle 50 and a spring 500. The power generating unit is installed interior of the housing 4 for generating electric power. The driving set 55 is installed interior of the housing 4 and formed by a plurality of speed changing gears for driving the power generating unit. The power generating unit transfers mechanic power to electric power. The handle 50 has an end pivotally installed in front of the housing 4 for driving the driving set 55. The spring 500 is installed within the housing 4 for resisting against the handle 50, thereby the handle 50 can be restore automatically. The handle 50 has a cambered rack 501 at the end thereof. A fastener 56 is installed on the inner surface of the housing for being engaged with a slot 502 of the handle 50 in order the handle 50 to be in alignment with the surface of the housing 4 when the manual power generator 5 is not used. The driving set 55 contains a first speed changing gear 551, a second speed changing gear 552. The first speed changing gear 551 contains a first gear 553 and a first pinion 554 engaged with the cambered rack 501. The first gear 553 and the first pinion 554 are coaxially mounted. The second speed changing gear 552 contains a second gear 558, a second pinion 559 engaged with the first gear 553, a prism plate 555 having two blocks 556 pivotally connected thereto, and a rotary wheel 557 coaxially secured to the second gear 558. The prism plate 555 is mounted integrally with the second pinion 559. The inner wall of the second gear 558 has several teeth grooves 558a. Each of said several teeth groove 558a has a vertical stopping wall (not shown). The rotary wheel 557 is coaxially secured to an input axis of the power generating unit.

With reference to FIG. 10, the transmission process is described as follows: when the handle 50 is pressed, the cambered rack 501 drives the first pinion 554 to rotate counterclockwise. Since the first pinion 554 and the first gear 553 are mounted integrally, they rotate synchronously. The first gear 553 drives the second pinion 559 to rotate clockwise. Since the second pinion 559 and the prism plate 555 are mounted integrally, they rotate synchronously. Because of the centrifugal force effect caused by the rotation of the prism plate 555, the two blocks 556 engage with the teeth grooves 558a against the vertical stopping wall. The two blocks 556 then drives the second gear 558 and the rotary wheel 557 rotate. Then, the rotary wheel 557 drives an input axis (not shown) of the power generating unit. Accordingly the power generating unit is driven.

With reference to FIG. 11, when the handle 50 is released, the spring 500 rejects the handle 50 to move clockwise. The first pinion 554 and the first gear 553 rotate clockwise and the second pinion 559 and the prism plate 555 rotate counterclockwise. The two blocks 556 are stretched because of the centrifugal force effect and the two blocks 556 slides off the teeth grooves 558a. Accordingly, the second gear 558 and the rotary wheel 557 cannot be driven when the handle 50 is released. Therefore the second gear 558, the rotary wheel 557 and the input axis of the power generating unit can only rotate in the same direction. When the handle 50 is held and pressed continuously, the cambered rack 501 drives the driving set 55. Because of the gear ratio effect, the rotary speed of the input axis of the power generating unit is increased through the driving set 55, so as to generate electric power.

There are several ways to practice the embodiments of the present invention. Referring to FIG. 5, the rechargeable device 2 engaged with the illuminating device 10 is used as flashlight, wherein the rechargeable device 2 provides electric power to the lamp 102 of the illuminating device 10. Referring to FIG. 4, the multifunction warning device is used as a warning sign with a tripod when the legs 21 are expended outwardly to be placed on the ground. In this practice, when the LEDs 211 are on, they can warn drivers of possible dangers. Even when the LEDs 211 are off, the light pervious shell 212 can reflect the lights from other automobiles to warn the drivers thereof of potential dangers. Referring to FIG. 3, the multifunction warning device is used as an illuminating traffic baton to direct automobiles at night, when the legs 21 are retracted and assembled to a baton body and the LEDs 211 are on. In this practice, the body 101 of the illuminating device 10 is used as a handle of the traffic baton.

Numerous characteristics and advantages of the invention have been set forth in the foregoing description, together with details of the structure and function of the invention, and the novel features thereof are pointed out in appended claims. The disclosure, however, is illustrated only, and changes may be made in detail, especially, in matters of shape, size and arrangement of parts, materials and the combination thereof within the principle of the invention, to the full extent indicated by the broad general meaning of the terms in which the appended claims are expressed.

We claim:

1. A multifunction warning device comprising:
   a base having a top portion and a bottom portion having a first electric socket therein;
   plural legs, each of said plural legs being pivotally secured to said base, each of said plural legs having plural illuminating elements thereon, said plural illuminating elements being electrically connected to said first electric socket; and
   a rechargeable device comprising:
      a shell having a charging connector detachably plugged into a said first electric socket, said charging connector having a first electric contact, a second electric contact and a third electric contact;
      plural rechargeable batteries, installed within said shell;
      a charging circuit, installed within said shell, said charging circuit being electrically connected to said plural rechargeable batteries and a first electrical point between said first electric contact and said second electric contact for recharging said plural rechargeable batteries through said first electric contact and said second electric contact; and
      a discharging circuit, installed within said shell, said discharging circuit being electrically connected to said plural rechargeable batteries and a second electrical point between said first electric contact and said third electric contact for providing electric power from said plural rechargeable batteries to said plural illuminating elements through said first electric contact, said third electric contact and said first electric socket;
   wherein said plural legs are stretchable to be a support and retractable to be assembled as a baton.

2. The multifunction warning device of claim 1, further comprising an illuminating device comprising: a body mounted at said top portion of said base and a lamp mounted at said body, said lamp being electrically connected to said rechargeable device.

3. The multifunction warning device of claim 1, wherein said base further comprising a first switch thereon for deciding whether said rechargeable device is electrically connected to said plural illuminating elements.

4. The multifunction warning device of claim 1, wherein said plural legs are three legs, said multifunction warning device further comprising three first rods and a first ring, each of said three first rods being pivotally connected to a middle portion of each of said three legs with one end and pivotally connected to said first ring with the other end.

5. The multifunction warning device of claim 1, wherein each of said plural legs comprises:
   a longitude frame having said plural illuminating elements thereon, said longitude frame being pivotally secured to said base; and
   a light pervious shell fastened to said longitude frame;
   wherein said light pervious shell covers said plural illuminating elements.

6. The multifunction warning device of claim 1, wherein said plural illuminating elements are LEDs.

7. The multifunction warning device of claim 2, wherein said body is detachably mounted to said top portion of said base, said body further comprising a second electric socket therein being pluggable by said charging connector.

8. The multifunction warning device of claim 2, wherein said body of said illuminating device further comprising a second switch thereon for deciding whether said rechargeable device is electrically connected to said lamp of said illuminating device.

9. The multifunction warning device of claim 2, wherein said lamp is pivotally mounted at said body.

10. The multifunction warning device of claim 2, further comprising a manual power generator installed in said body for manually providing electric power to said lamp.

11. The multifunction warning device of claim 4, further comprising three bars, each of said three bars being engaged with two adjacent legs for enhancing strength of said three legs, each of said three bars having two protrusions on its two ends respectively, each of said three legs comprising two holes therein, wherein one of said two protrusions is engaged with a hole of a leg and the other protrusion is engaged with a hole of an adjacent leg.

12. The multifunction warning device of claim 4, further comprising a bottom cover having three engaging hooks thereon, each of said plural legs having a positioning hook at its end, wherein each of said three engaging hooks is engaged with each of said positioning hook when the bottom cover is tightened to assemble said plural legs as a baton.

13. The multifunction warning device of claim 4 further comprising three second rods and a second ring, each of said three second rods pivotally connected to a front portion of each of said three legs with one end and pivotally connected to said second ring with the other end.

14. The multifunction warning device of claim 7, wherein said body of said illuminating device further comprising a second switch and a third switch thereon, wherein said second switch is for deciding whether said rechargeable device is electrically connected to said lamp of said illuminating device and said third switch is for deciding whether said rechargeable device is electrically connected to said plural illuminating elements.

15. The multifunction warning device of claim 7, wherein said top portion of said base forms an outer threaded periphery engagable with an inner threaded periphery in said body of said illuminating device.

16. The multifunction warning device of claim 10, wherein said manual power generator comprising:
   a housing;
   a power generating unit, installed interior of said housing for generating electric power;
   a handle, having an end pivotally installed in front of said housing, said handle having a cambered rack at another end thereof;
   a driving set, installed interior of said housing for driving said power generating unit, said driving set comprising a first speed changing gear, and a second speed changing gears, said first speed changing gear comprising a first gear and a first pinion engaged with said cambered rack, said first gear and said first pinion being coaxially mounted, said second speed changing gear comprising a second gear, a second pinion engaged with said first gear, a prism plate having two blocks pivotally connected thereto, and a rotary wheel coaxially secured to said second gear, said prism plate being mounted integrally with said second pinion, said second gear having an inner wall having several teeth grooves, each of said several teeth grooves having a vertical stopping wall, said rotary wheel being coaxially secured to an input axis of said power generating unit;
   a fastener, installed on an inner surface of said housing for being engaged with a slot of said handle in order said handle to be in alignment with said surface of said housing when said manual power generator is not used; and
   a spring, installed within said housing for resisting against said handle, thereby said handle can be restored automatically.

17. The multifunction warning device of claim 12, further comprising a rope connected said first ring to said bottom cover.

18. The multifunction warning device of claim 15, wherein said top portion of said base further comprises plural outer elastic electric contacts thereon and said body of said illuminating device further comprises plural inner ring electric contacts therein, said plural outer elastic electric contacts being electrically connected to said plural inner ring electric contacts when said body is threadly mounted at said top portion of said base.

* * * * *